United States Patent Office 3,099,648
Patented July 30, 1963

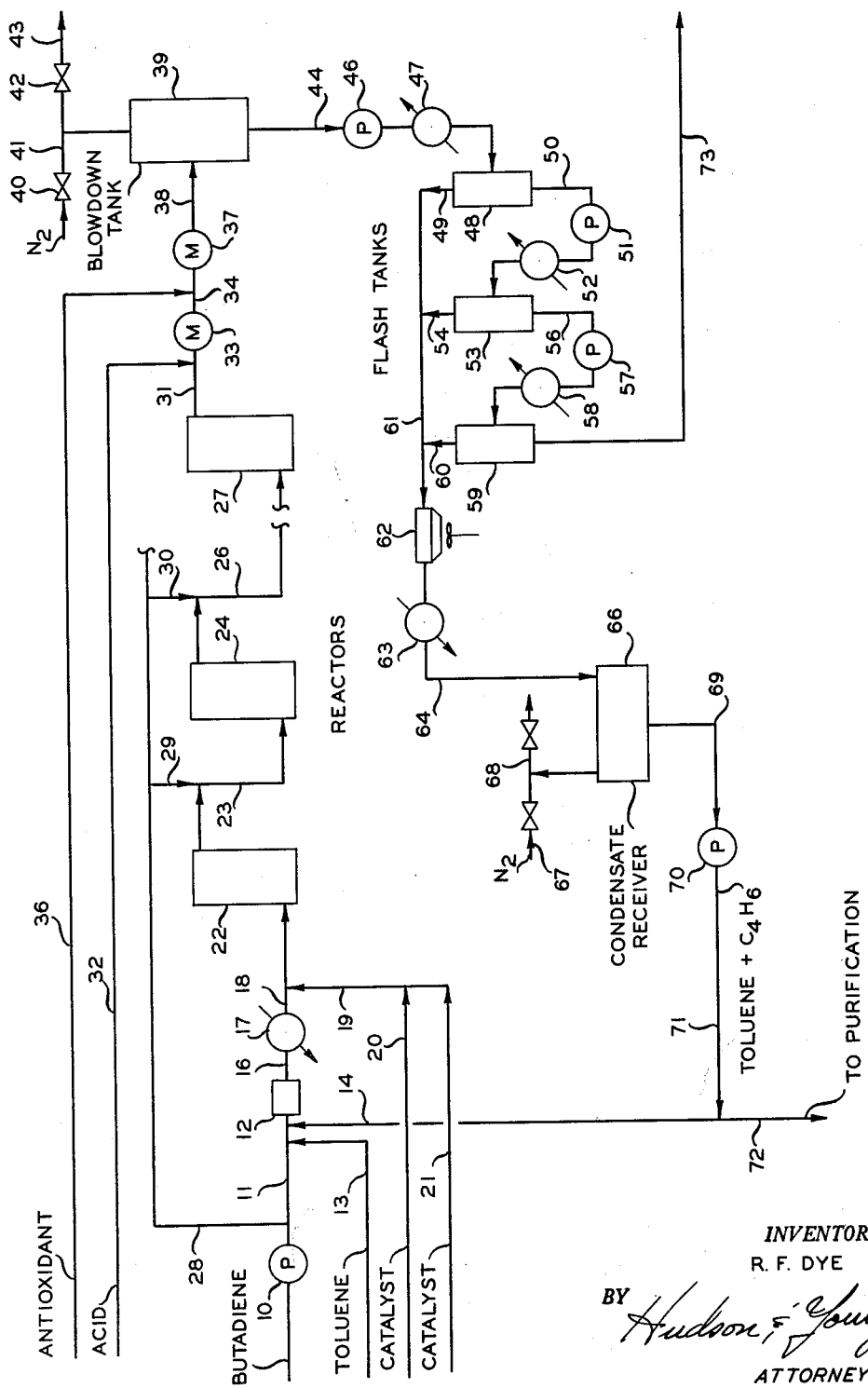

3,099,648
ROSIN ACID CATALYST INACTIVATOR
Robert F. Dye, Bartlesville, Okla., assignor to Phillips Petroleum Company, a corporation of Delaware
Filed July 25, 1960, Ser. No. 45,042
7 Claims. (Cl. 260—94.3)

This invention relates to improved polymerization and recovery methods in the production of polymers from conjugated dienes. In one of its more specific aspects it relates to an improved method of terminating a polymerization reaction by inactivation of the catalyst.

Continuous polymerization processes generally include steps operated continuously to remove unreacted materials and the product from the reactor effluent. When polymerizing conjugated dienes to rubbery polymers in the presence of a catalyst system containing organometals or metal hydrides, it is highly desirable that the polymerization be restricted to the carefully controlled conditions of the reactor. If polymerization is permitted to continue during the recovery operations the product will very probably lack uniformity in physical properties.

According to my invention, an improved method of polymerizing conjugated dienes in the presence of a catalyst which contains as an essential component a compound selected from the group consisting of organometals and metal hydrides of Groups I, II and III metals and the continuous recovery of unreacted materials from the reaction effluent is provided. In this continuous polymerization in which the conjugated diene in a liquid diluent is contacted with a catalyst such as that described above, a material having active hydrogen groups and low volatility is added to the reaction effluent in sufficient amount to inactivate the catalyst. Thereafter a portion of the effluent can be vaporized to form a vapor stream containing diluent and unreacted monomer which can then be returned directly to the polymerization process. The use of the catalyst inactivating agent having low volatility in this manner permits the termination of the polymerization immediately after the polymerization mixture leaves the reactors and prior to the recovery steps in which the unreacted monomers are separated from the reactor effluent. Because of the low volatility of the catalyst inactivating agent the danger of carrying this agent with the flashed vapors back to the polymerization reaction is avoided.

According to another and preferred aspect of my invention in the production of a rubbery polymer by the above described polymerization of conjugated dienes, rosin acid is added to the reaction effluent stream in an amount at least sufficient to inactivate the catalyst prior to the recovery steps. I have found that rosin acid is a very effective catalyst inactivating agent in this process and, furthermore, is not carried over with the flashed monomer vapors which are returned to the polymerization reaction. Also, the rosin acid remains substantially in the polymer product to provide advantages in the rubbery polymer, such as to lower the amount of heat build up and effecting a more desirable cure. In this manner an ingredient beneficial to the properties of the final product can be incorporated in the product at a stage in the process which permits the added advantage of terminating the polymerization at the most desirable point in the process.

It is an object of my invention to provide an improved process for the polymerization of conjugated dienes and the recovery of unreacted materials from such polymerization. It is a further object of my invention to provide a method of terminating a polymerization reaction by inactivating the polymerization catalyst prior to removal of unreacted materials from the reaction effluent. Still another object is to employ a catalyst inactivating agent which will remain in the polymer product to benefit the physical properties thereof. Other objects, advantages, and features of my invention will be apparent to those skilled in the art from the following discussion and drawing which shows a schematic flow diagram of the polymerization, catalyst inactivation and recovery and recycle of unreacted monomer according to my invention.

Preferably the monomeric material polymerized to produce rubbery polymers by this process comprises conjugated dienes containing from 4 to 8, inclusive, carbon atoms. Examples of conjugated dienes which can be used include 1,3-butadiene, 2-methyl-1,3-butadiene (isoprene), 2,3-dimethyl - 1,3 - butadiene, 2-methyl-1,3-pentadiene, chloroprene, 1-cyanobutadiene, 2,3-dimethyl - 1,3 - pentadiene, 2-methyl - 3 - ethyl-1,3-pentadiene, 2-methoxybutadiene, 2-phenylbutadiene, and the like. In a preferred process, isoprene is polymerized in the presence of a catalyst to be described to form cis-1,4-polyisoprene having a chemical structure substantially the same as that of natural rubber. In another preferred process, 1,3-butadiene is polymerized in the presence of one of the catalyst systems herein described to form polybutadiene in which an excess of 90 percent of the polymer is formed by 1,4-addition of butadiene.

This invention is applicable to the polymerization of the above-defined conjugated dienes either alone or in admixture with each other and/or with, in minor amounts, one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene, and 1-octene. Branched chain olefins, such as isobutylene, can be used as well as 1,1-dialkyl-substituted and 1,2-dialkyl-substituted ethylenes such as butene-2, pentene-2, hexene-2, heptene-2, 2-methylbutene-1, 2-methylhexene-1, 2-ethylheptene-1, and the like. Other olefins which can be used include di- and polyolefins, such as 1,5-hexadiene, 1,4-pentadiene and 1,4,7-octatriene, and cyclic olefins, such as cyclohexene. Other examples of compounds containing an active $CH_2=C<$ group which are copolymerizable with one or more of the conjugated dienes are styrene, divinyl benzene, 3-vinyl toluene, 1-vinyl naphthalene, 3-methyl styrene, acrylonitrile, methacrylonitrile, methyl acrylate, methyl methacrylate, vinyl acetate, vinyl chloride, 2-methyl-5-vinylpyridine, 2-vinylpyridine, 4-vinylpyridine, and the like.

As mentioned hereinabove, this invention is particularly applicable to the production of rubbery polymers. The term "rubbery polymer" includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. The rubbery polymers so produced are preferably linear, soluble polymers.

The catalyst systems which can be used in processes involving my invention are in general those which contain as an essential component a compound selected from the group consisting of organometals or metal hydrides, the metals being one of Groups I, II or III of the Periodic Table. I prefer to use catalyst systems which comprise (a) a hydride or organo compound of one of the metals aluminum, gallium, indium, thallium and beryllium, and (b) a di-, tri- or tetrahalide of a Group IV metal, such as titanium, silicon, thorium, zirconium, tin, lead, hafnium, germanium, or cerium.

The hydrides or organo compounds used in these catalyst systems correspond to the general formula $MR_x$, wherein M is one of the metals aluminum, gallium, indium, thallium, or beryllium, R is hydrogen, a monovalent saturated acyclic hydrocarbon radical, a monovalent saturated cyclic hydrocarbon radical, a monovalent hydrocarbon aromatic radical or any combination thereof, and wherein $x$ is equal to the valence of the metal, i.e., 2 or 3. Examples of these catalysts which can be used are $Al(C_2H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$,

$In(C_6H_5)_3$ and the like. These polymerization catalysts can also be used in the form of their known and stable organic complexes, such as complexes with ethers, thioethers, amines, alkali metal hydrides, alkali metal alkyls or alkali metal aryls. Examples of such complex compounds which can be used as the catalyst are $LiAlH_4$, $NaAl(CH_3)_4$, $NaBe(C_6H_5)_3$, $NaBe(C_2H_5)_3$ and the like.

In admixture with one or more of the $MR_x$ compounds described above, the catalyst comprises at least one Group IV metal (Mendeléeff's Periodic System) di-, tri- or tetrahalide. The di-, tri- or tetrahalides of any or all of the Group IV metals can be used, including titanium, silicon, thorium, zirconium, tin, lead, hafnium, germanium and cerium. Di-, tri and tetrachlorides, di-, tri- and tetrabromides, di-, tri- and tetraiodides and di-, tri- and tetrafluorides of the Group IV metals can be used in the catalyst composition either individually or as mixtures. The term "Group IV metal" as used herein is defined as meaning any or all of the foregoing metals, and silicon is defined as a Group IV metal for these purposes. The tetrahalides of titanium and zirconium are the preferred compounds, with the tetrachlorides and tetraiodides of these metals being especially useful because they have a high activity.

Among catalyst compositions which are preferred are the following: a mixture of titanium tetraiodide and triethylaluminum; a mixture of titanium tetraiodide and tripropylaluminum; a mixture of titanium tetraiodide and tributylaluminum; a mixture of titanium tetrachloride and triethylaluminum; and a mixture of zirconium tetrachloride and triethylaluminum. A third component can be used if desired. For example, a catalyst comprising triisobutylaluminum, titanium tetrachloride and iodine or one comprising ethylaluminum dichloride, can be used if desired. For example, a catalyst comprising triisobutylaluminum, titanium tetrachloride and iodine or one comprising ethylaluminum dichloride, cobaltous chloride and pyridine can be used to polymerize, 1,3-butadiene to a polymer of high cis content.

One of the most preferred processes for my invention involves the polymerization of 1,3-butadiene in the presence of a catalyst comprising trialkylaluminum, for example, triisobutylaluminum and titanium tetraiodide. Polybutadiene thus produced is a rubbery polymer containing as high as 90 percent and higher cis-1,4 addition.

The instant invention will be described in connection with a preferred process for producing a "snappy" or "nervy" polymer of 1,3-butadiene. Broadly speaking, this process comprises contacting 1,3-butadiene with a catalyst comprising (a) a compound corresponding to the formula $R_3Al$, wherein R is an alkyl radical containing from 1 to 12, inclusive, carbon atoms, (b) titanium tetrachloride and (c) titanium tetraiodide. Examples of organo aluminum compounds corresponding to the aforementioned formula which can be employed in the process include trimethylaluminum, triethylaluminum, triisobutylaluminum, tri-n-pentylaluminum, triisooctaluminum, tri-n-dodecylaluminum, and the like.

The mol ratio of the organo aluminum compound corresponding to the formula $R_3Al$ to the titanium tetraiodide is in the range of 2:1 to 100:1. The mol ratio of the organo aluminum compound to the titanium tetrachloride is in range of 2:1 to 100:1 while the mol ratio of titanium tetrachloride to titanium tetraiodide is in the range of .5:1 to 5:1. The minimum catalyst level below which conversion is not obtained is about 1.0 gram millimoles of organo aluminum compound per 100 grams of the 1,3-butadiene to be polymerized. The upper catalyst level is dependent upon the desired molecular ratio; however, from a practical viewpoint, it should not be above about 20 gram millimoles of organo aluminum compound per 100 grams of 1,3-butadiene.

The temperature at which the polymerization process is carried out should not exceed 300° F. in order to maintain the degree of gel formation as low as possible. The temperature is generally within the range of −150° F. to 212° F. but it is preferred to operate in the range of about −60° F. to 120° F. In the formation of cis 1,4-polybutadiene, a temperature range of about 10° F. to 50° F. is preferred.

The polymerization is preferably carried out in the presence of an inert, hydrocarbon diluent. The pressure is generally that sufficient to maintain monomeric material substantially in the liquid phase although higher pressures can be employed, if desired, such as by pressurizing with an inert gas. Subatmospheric pressures, e.g. 5 to 10 p.s.i.a., can be used with certain diluents such as benzene if it is desired to cool the reaction mixture by reflux cooling. The catalyst concentration can vary over a wide range and is usually in the range of about 0.01 to 15 weight percent or higher, based on the monomeric material charged to the reactor. The preferred catalyst concentration in the production of cis 1,4-polybutadiene is in the range of 0.05 and 10 weight percent and more preferably between 0.05 and 5 weight percent based on the 1,3-butadiene charged to the reactor. In general, at the lower mol ratios of trialkylaluminum to titanium tetraiodide, it is, frequently desirable to operate above the minimum level of catalyst concentration.

Suitable diluents for use in the polymerization process are paraffins, cycloparaffins and/or aromatic hydrocarbons which are relatively inert, non-deleterious and liquid under the reaction conditions of the process. The lower molecular weight paraffins, such as propane, butane, and pentane are especially useful when the process is carried out at low temperatures. However, the higher molecular weight paraffins and cycloparaffins such as isooctane, cyclohexane, methylcyclohexane and aromatic diluents such as benzene, toluene and the like, as well as mixtures of these diluents can also be used. Reactor residence time can vary widely, for example, from 1 second to 1 hour or more for continuous reactions.

To more fully describe my invention reference is now made to the drawing. In discussing the process in connection with the drawing reference is made to specific materials and reaction conditions for purposes of simplicity. It should be understood, however, that my invention is not limited in this fashion.

Butadiene is fed continuously by pump 10 through line 11 to mixing zone 12, such as a multi-orifice contactor. Reaction diluent, e.g. toluene, is continuously fed into line 11 through line 13 and likewise a recycle stream containing toluene and butadiene is fed to line 11 through line 14. Thus the recycle materials and the fresh butadiene and reaction diluent are thoroughly mixed in contactor 12. This mixture is then passed through line 16 to heat exchanger 17 wherein the mixture is cooled, preferably to about 5 to 25° F. Catalyst is then added to the cooled mixture of monomer and diluent in line 18, the catalyst entering through line 19. The multi-component catalyst system is mixed in line 19; for example a solution of titanium tetrachloride and titanium tetraiodide is added through line 20 while a solution of triisobutylaluminum is added through line 21. The reaction mixture is then passed through line 18 to reactor 22 where the butadiene is contacted with the catalyst under polymerization conditions.

The effluent from reactor 22 passes through line 23 to reactor 24 and the effluent from reactor 24 likewise passes through line 26 to a downstream reactor in series, finally entering the last reactor 27 in the series. Any number of reactors can be employed in this series; preferably at least 3 reactors and generally not more than 12 or 15 are used. The pressure of the reaction is maintained so that the reaction mixture is in a liquid phase. As pointed out above, the preferred operating temperature is in the range of 10 to 50° F. and I prefer to operate the reactors in series so that the temperature of the first reactor is less than the temperature of the final reactor. The temperature of the intermediate reactors can be at values intermediate the first and final reactor of the series. I have found that this is desirable in order to keep the temperature of any reactor from going above a desired maximum. Since the concentration of monomer is highest in the first reactor, there is a tendency for a more rapid reaction therein and by maintaining the temperature of the first reactor at a lower value than in the subsequent reactors it is much easier to maintain the reaction within the desired operating limitations.

As an alternative to the gradation of operating temperatures in the reactors in series I can add monomer incrementally to the reaction by passing a portion of the butadiene from line 11 through line 28 and introducing this portion to the downstream reactors via lines 29 and/or 30 and so forth. By varying the amount of monomer added in this fashion it is also possible to control the viscosity or Mooney of the polymer in the finished product; for example, by adding a portion of the monomer to the downstream reactors I can increase the Mooney value of the final polymer. The Mooney value can also be decreased or increased by increasing or decreasing, respectively, the amount of catalyst fed to the reaction.

As the reaction effluent leaves the last reactor 27 in the series and passes through line 31 a non-volatile catalyst inactivating agent having active hydrogen groups is added through line 32 in an amount sufficient to inactivate the catalyst. The reaction effluent and the inactivating agent are thoroughly mixed in mixer 33. By "non-volatile" I refer to the relative volatility of the agent under the conditions employed to separate unreacted material from the reactor effluent. Since these reacted materials are to be recycled to the reaction it is important that essentially all of the catalyst inactivating agent remain with the polymer and catalyst. It is only through the use of such relatively non-volatile agents that I can afford to stop the reaction by catalyst poisoning immediately following the reactors.

As discussed above, the preferred catalyst inactivating agent is rosin acid because of the beneficial effects that this agent has on the finished polymer, and because I have found that none of this inactivating agent is carried over with the monomer which is recovered and recycled to the polymerization process. Rosin acid, which is a disproportionated abietic acid, is commercially available. The amount of inactivating agent should be at least sufficient and preferably an excess of that required to render the catalyst in the effluent completely inactive. This depends upon the catalyst and the inactivating agent chosen and can readily be determined since precise measurements are not essential, the inactivating agent being nonvolatile and remaining in the polymer. For example, with triisobutylaluminum as the organometal component about 1 to 2 parts of rosin acid will quench 1 part of weight of triisobutylaluminum. Since normally less than 1 part of triisobutylaluminum or similar compound per 100 parts by weight of polymer will be present in the reaction effluent, rosin acid can be added to provide a specification content of about 1 to 2 phr. rosin acid in the finished product. Compounders are thus provided with a product containing a known and constant quantity of rosin acid which they can supplement or not, as they choose.

As the effluent stream leaves mixer 33 through line 34 antioxidant is added via line 36 and the stream again passes through a mixer 37 and thence through line 38 to surge tank 39. Any of a number of well known rubber antioxidants can be used, for example, N-isopropyl-N'-phenyl-p-phenylenediamine, N - phenyl-N'-cyclohexyl-p-phenylenediamine, and the like. One or more surge tanks can be employed and all of these tanks should be blanketed with an inert gas such as nitrogen. The pressure within these tanks is maintained by pressurizing the tank with nitrogen by opening valve 40 in line 41 or the pressure can be reduced by venting the vapors in tank 39 to a flare by opening valve 42 in line 43. This pressure control can, of course, be done automatically.

The effluent stream in which the catalyst has been inactivated passes from surge tank through line 44, pump 46 and heater 47 to flash tank 48. The pressure of the stream is increased substantially by pump 46, heated in exchanger 47 and then reduced to about atmospheric pressure or slightly above in flash vessel 48. Flashed vapors are withdrawn overhead from vessel 48 through conduit 49 while the unvolatilized liquid is withdrawn through conduit 50. This flashing operation is then repeated by repressurizing the liquid in conduit 50 in pump 51 and heating in exchanger 52. The pressure is again let down in flash vessel 53, flashing vapors which pass overhead through conduit 54. This operation is performed again with the liquid in conduit 56 utilizing pump 57 and exchanger 58, the third flash occurring in vessel 59. Vapors from vessel 59 pass overhead in conduit 60 and all the flashed vapors are gathered in header 61. Pumps 47, 51 and 57 can be operated so that the pressures developed decrease sequentially.

The overhead vapors from flash vessels 48, 53 and 59 pass through line 61 to air cooled condenser 62 and thence to cooler 63. The condensed liquid which contains butadiene and a substantial amount of toluene is passed through line 64 to condensate receiver 66. The pressure in receiver 66 is maintained in the same fashion as discussed in connection with storage tank 39 utilizing a blanket of nitrogen which enters through line 67. Vapors can be vented through line 68. The condensate is withdrawn from receiver 66 through line 69 and passed by pump 70 through line 71. Most of this condensate is recycled through line 14 to the polymerization process as previously described. A portion of the condensate is purged through line 72 to a purification operation in order to keep volatile impurities from building up in the system. The effluent stream is withdrawn from the last flash vessel 59 in the series and is passed via line 73 to subsequent recovery operations. At this point substantially all of the unreacted butadiene has been removed and the concentration of the polymer in the solvent has increased materially, for example, from about 5 to 15 weight percent.

While not shown in the drawing this polymer solution in line 73 can be passed to a storage tank and the polymer then recovered from the solution by steam stripping to remove the solvent. A slurry of polymer crumb in water is passed to a storage tank and the polymer is separated from the slurry by passing over a shaker screen, through a compacting auger and finally through an extruder-drier.

As an example of my invention the following specific operation is described in detail with reference to the flow as shown in the above-discussed drawing. In this example nine reactors are employed in series operating at the pressure and temperatures shown in Table I. Polybutadiene is formed by contacting butadiene with a catalyst which contains triisobutylaluminum in combination with titanium tetrachloride and titanium tetraiodide to a total conversion of 60 percent. The residence time in the 9 reactors is 2.1 hours. The catalyst is quenched after polymerization by the addition of rosin acid in an amount sufficient to provide about 2 phr. of rosin acid in the recovered polymer. This is somewhat in excess of twice the amount necessary to fully quench the catalyst. Methylene-2,2'bis[4-methyl-6-tert butylphenol] is added as an antioxidant. The effluent in which the catalyst has thus been inactivated is flashed in 3 zones in series. The vaporized material is recycled in part and purged in part, and the unvaporized material is passed to subsequent operations for polymer recovery.

The flow rates of the various streams are shown in a material balance of Tables I and II with reference to the conduits as numbered in the drawing. The quantities shown are in pounds per day.

Table I

| Vessel | Temp. (° F.) | Pressure (p.s.i.a.) | Incremental conversion (percent) | Fresh butadiene added (98% pure) |
|---|---|---|---|---|
| Reactor 1 (22) | 25 | 65 | 15.7 | |
| Reactor 2 (24) | 31 | 65 | 10.3 | 34,291 |
| Reactor 3 | 35 | 65 | 7.5 | 29,692 |
| Reactor 4 | 38 | 65 | 6.5 | 25,305 |
| Reactor 5 | 39 | 65 | 5.3 | 20,715 |
| Reactor 6 | 40 | 65 | 4.2 | 16,835 |
| Reactor 7 | 40 | 65 | 3.9 | 15,305 |
| Reactor 8 | 40 | 65 | 3.6 | 13,775 |
| Reactor 9 (27) | 40 | 65 | 3.0 | 12,252 |
| Storage (39) | 40 | 20 | | |
| Exit heater (47) | 340 | 370 | | |
| Flash 1 (48) | 227 | 16 | | |
| Exit heater (52) | 340 | 280 | | |
| Flash 2 (53) | 235 | 16 | | |
| Exit heater (58) | 328 | 205 | | |
| Flash 3 (59) | 235 | 16 | | |
| Receiver (66) | 100 | 15 | | |

Table II

| Materia | Line | | | | | | | | | | |
|---|---|---|---|---|---|---|---|---|---|---|---|
| | (19) | (14) | (13) | (11) | (28) | (31) | (32) | (36) | (49) | (54) | (60) |
| Butadiene | | 66,693 | | | 164,814 | 91,933 | | | 85,088 | 5,946 | 693 |
| Butadiene impurities | | 8,823 | | | 3,356 | 12,179 | | | 11,241 | 802 | 92 |
| Toluene | 8,847 | 1,447,772 | 1,322,221 | | | 2,778,840 | 11,110 | 1,388 | 990,300 | 630,500 | 370,3997 |
| Polymer | | | | | | 138,879 | | | | | |
| TiCl₄ | | 89 | | | | 89 | | | | | |
| TiI₄ | | 260 | | | | 260 | | | | | |
| Triisobutylaluminum | | 926 | | | | 926 | | | | | |
| Heavies | | | 695 | | | 1,390 | | | | | |
| Rosin Acid | | | | | | | 2,780 | | | | |
| Antioxidant | | | | | | | | 347 | | | |

As will be evident to those skilled in the art, various modifications of this invention can be made, or followed, in the light of the foregoing disclosure and discussions, without departing from the spirit or scope thereof.

I claim:

1. A continuous polymerization process which comprises contacting conjugated diene in liquid diluent with a catalyst which forms on mixing components comprising a compound selected from the group consisting of organometals and metal hydrides of Groups I, II and III metals and a halide of a Group IV metal under conditions to polymerize a portion of said conjugated diene, adding to the process effluent rosin acid to inactivate said catalyst, thereafter vaporizing a portion of said effluent to form a vapor stream containing diluent and unreacted conjugated diene essentially free of catalyst poison, and returning at least a portion of said stream to the polymerization process.

2. The process of claim 1 wherein said conjugated diene is butadiene and said catalyst components include trialkylaluminum and titanium tetraiodide.

3. A continuous polymerization process wherein conjugated diene is contacted with a catalyst which forms on mixing components comprising a compound selected from the group consisting of organometals and metal hydrides of Groups I, II and III metals and a halide of a Group IV metal which comprises contacting said conjugated diene in a liquid diluent with said catalyst in a plurality of reaction zones connected in series inactivating the catalyst in the effluent from the last of said zones with rosin acid, volatilizing a portion of said effluent to form a vapor stream of unreacted conjugated diene and diluent essentially free of catalyst poison, and recycling at least a portion of said stream to the polymerization process.

4. The process of claim 3 wherein conjugated diene is added to each of said reaction zones in addition to the unreacted diene entering from a preceding reaction zone.

5. The process of claim 3 wherein all of said catalyst and said recycled unreacted conjugated diene is fed to the first of said reaction zones.

6. In a process for the production of rubbery polymer by polymerization of conjugated diene in the liquid phase in a reaction zone in the presence of a catalyst which forms on mixing components comprising a compound selected from the group consisting of organometals and metal hydrides of Groups I, II and III metals and a halide of a Group IV metal with subsequent recovery of unreacted conjugated diene and polymer from the reaction zone effluent containing catalyst, polymer and unreacted conjugated diene, the improvement which comprises adding rosin acid to said effluent in an amount at least sufficient to inactivate said catalyst prior to said recovery steps and thereafter vaporizing a portion of said effluent to effect said recovery of unreacted conjugated diene in a condition essentially free of catalyst poison.

7. The process of claim 6 wherein sufficient rosin acid is added to said effluent to provide about 1 to 2 parts by weight rosin acid in 100 parts of the recovered polymer.

References Cited in the file of this patent

UNITED STATES PATENTS

| 2,563,624 | Small | Aug. 7, 1951 |
| 2,918,461 | Flynn | Dec. 22, 1959 |
| 2,953,556 | Wolfe | Sept. 20, 1960 |
| 2,964,516 | Henderson | Dec. 13, 1960 |